US010783074B2

(12) United States Patent
Na

(10) Patent No.: US 10,783,074 B2
(45) Date of Patent: Sep. 22, 2020

(54) CONTROLLER FOR PERFORMING GARBAGE COLLECTION, METHOD FOR OPERATING THE SAME, AND MEMORY SYSTEM INCLUDING THE SAME

(71) Applicant: SK hynix Inc., Gyeonggi-do (KR)

(72) Inventor: Hyeong-Ju Na, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/169,230

(22) Filed: Oct. 24, 2018

(65) Prior Publication Data

US 2019/0266082 A1 Aug. 29, 2019

(30) Foreign Application Priority Data

Feb. 27, 2018 (KR) .................. 10-2018-0023714

(51) Int. Cl.
*G06F 12/02* (2006.01)
*G06F 3/06* (2006.01)

(52) U.S. Cl.
CPC .......... *G06F 12/0253* (2013.01); *G06F 3/061* (2013.01); *G06F 3/064* (2013.01); *G06F 3/0679* (2013.01); *G06F 2212/7201* (2013.01); *G06F 2212/7205* (2013.01)

(58) Field of Classification Search
CPC ............ G06F 12/0253; G06F 12/0292; G06F 2212/7201; G06F 2212/7205; G06F 3/061; G06F 3/064; G06F 3/0679
See application file for complete search history.

(56) References Cited

U.S. PATENT DOCUMENTS

| 2011/0055458 | A1* | 3/2011 | Kuehne | G06F 12/0246 |
| | | | | 711/103 |
| 2016/0133329 | A1* | 5/2016 | Moon | G11C 16/14 |
| | | | | 365/185.11 |
| 2017/0228313 | A1* | 8/2017 | Boitei | G06F 12/0253 |
| 2019/0146925 | A1* | 5/2019 | Li | G06F 12/10 |
| | | | | 711/103 |

FOREIGN PATENT DOCUMENTS

KR  1020160044989  4/2016

* cited by examiner

*Primary Examiner* — Baboucarr Faal
*Assistant Examiner* — Jane Wei
(74) *Attorney, Agent, or Firm* — IP & T Group LLP

(57) ABSTRACT

A controller includes a memory device storing data and including a memory interface a processor; and a memory, wherein, when data is stored in all pages of an open block of a memory device, the processor determines a number of valid pages in the open block and performs a garbage collection on the open block when the number of valid page(s) is determined to be less than or equal to a threshold value, wherein the number ranges from zero to the total number of pages in the open block.

17 Claims, 12 Drawing Sheets

CONTROLLER FOR PERFORMING GARBAGE COLLECTION, METHOD FOR OPERATING THE SAME, AND MEMORY SYSTEM INCLUDING THE SAME

CROSS-REFERENCE TO RELATED APPLICATION

This application claims priority under 35 U.S.C. § 119(a) to Korean Patent Application No. 10-2018-0023714, filed on Feb. 27, 2018, which is incorporated herein by reference in its entirety.

BACKGROUND

1. Field

Various embodiments relate to a memory related technology, and more particularly, to a controller for controlling a memory device, a method for operating the same and a memory system including the same.

2. Discussion of the Related Art

The computer environment paradigm has shifted to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts, as compared with a hard disk device. Examples of memory systems having such advantages include universal serial bus (USB) memory devices, memory cards having various interfaces, and solid state drives (SSD).

SUMMARY

Various embodiments are directed to a controller, a method for operating the same and a memory system including the same, capable of increasing operational performance.

In an embodiment, a controller may include: a processor; and a memory, wherein, when data is stored in all pages of an open block of a memory device, the processor determines a number of valid pages in the open block and performs a garbage collection on the open block when the number of valid page(s) is determined to be less than or equal to a threshold value, wherein the number ranges from zero to the total number of pages in the open block.

In the above controller, the processor may generate mapping information on the open block and store the mapping information in the memory while storing data in the open block. The mapping information may include a physical address to logical address (P2L) map in which a logical address corresponding to the data is mapped to a physical address. The mapping information may include a physical address corresponding to the valid pages and may not include a physical address corresponding to one or more invalid pages. The processor may perform the garbage collection using the mapping information. The processor may determine the number of valid pages and performs the garbage collection before closing the open block. The processor may store information on the number of the valid pages of the open block in the memory while generating the mapping information. The processor may close the open block when the number of the valid pages is determined to exceed the threshold value.

In an embodiment, a method for operating a controller may include: storing data in an open block of a memory device in response to a data write request from a host; determining a number of valid pages in the open block when data is stored in all pages of the open block, wherein the number ranges from zero to the total number of pages in the open block; and performing a garbage collection on the open block when the number of valid pages is determined to be less than or equal to a threshold value.

In the above method, the storing of the data in the open block may include generating mapping information on the open block and storing the mapping information in a memory. The mapping information may include a physical address to logical address (P2L) map in which a logical address corresponding to the data is mapped to a physical address. The mapping information may include a physical address corresponding to the valid pages and may not including a physical address corresponding to one or more invalid pages. The performing of the garbage collection may use the mapping information. The determining of the number of valid pages and the performing of the garbage collection may be carried out in a state in which the open block is not closed. The generating of the mapping information may further include storing information on the number of valid pages of the open block in the memory. The method may further include: closing the open block when the number of valid pages is determined to exceed the threshold value.

In an embodiment, a memory system may include: a memory device for storing data; and a controller for controlling the memory device, wherein, when data is stored in all pages of an open block of the memory device, the controller determines a number valid pages in the open block and performs a garbage collection on the open block when it is determined that the number of the valid pages is less than or equal to a threshold value, wherein the number ranges from zero to the total number of pages in the open block.

In the above memory system, the controller may generate mapping information on the open block and manage the mapping information while storing data in the open block. The mapping information may include a physical address corresponding to the valid pages while not including a physical address corresponding to one or more invalid pages. The controller may perform the garbage collection using the mapping information.

In an embodiment, a memory system may include: a memory device including a plurality of blocks, each for storing data, wherein each block is closed after a last page of that block is programmed with a data; and a controller configured to control operations carried out in the memory device, wherein, before a select block, of the plurality of blocks, is closed, the controller determines whether to perform a garbage collection on the select block based on a condition pertaining to a number of valid page(s) in the select block, and wherein the controller performs the garbage collection on the select block when the condition is met.

BRIEF DESCRIPTION OF THE DRAWINGS

These and other features and advantages of the present disclosure will become apparent to those skilled in the art to which the present disclosure pertains from the following detailed description in reference to the accompanying drawings.

DETAILED DESCRIPTION

Figure 1:
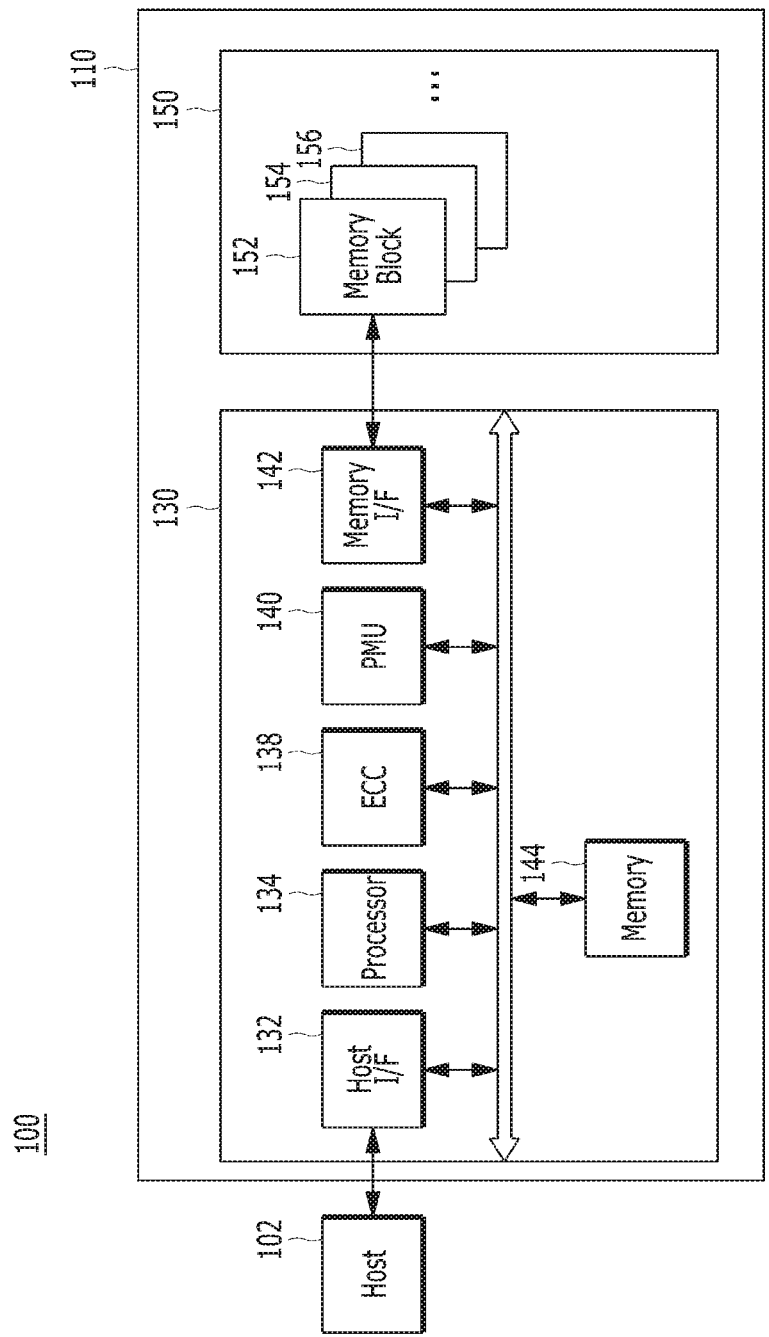
FIG. 1 is a block diagram illustrating a data processing system including a memory system in accordance with an embodiment of the present disclosure.

Various embodiments of the present disclosure are described below in more detail with reference to the accompanying drawings. It is noted, however, that elements and features of the present disclosure may be configured or arranged differently than shown or described herein. Thus, the present invention is not limited to the embodiments set forth herein. Rather, the described embodiments are provided so that this disclosure is thorough and complete and fully conveys the present disclosure to those skilled in the art to which this disclosure pertains. Throughout the disclosure, like reference numerals refer to like parts throughout the various figures and embodiments of the present disclosure.

It will be understood that, although the terms "first", "second", "third", and so on may be used herein to identify various elements, these elements are not limited by these terms. These terms are used to distinguish one element from another element that otherwise have the same or similar names. Thus, a first element in one instance could be identified as a second or third element in another instance without departing from the spirit and scope of the present disclosure.

The drawings are not necessarily to scale and, in some instances, proportions may have been exaggerated in order to clearly illustrate features of the embodiments.

It will be further understood that when an element is referred to as being "connected to", "coupled to", or "in communication with" another element, such connection, coupling, or communication may be wired or wireless, either of which may be direct or indirect, i.e., through one or more intervening elements. In addition, it will also be understood that when an element is referred to as being "between" two elements, it may be the only element between the two elements, or one or more intervening elements may also be present.

The terminology used herein is for describing particular embodiments and is not intended to be limiting of the present disclosure. As used herein, singular forms are intended to include the plural forms and vice versa, unless the context clearly indicates otherwise. It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present disclosure belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

It is also noted, that in some instances, as would be apparent to those skilled in the relevant art, a feature or element described in connection with one embodiment may be used singly or in combination with other features or elements of another embodiment, unless otherwise specifically indicated. Also, throughout the specification, reference to "an embodiment," "another embodiment," or the like is not necessarily to only one embodiment, and different references to any such phrase are not necessarily to the same embodiment(s).

FIG. 1 is a block diagram illustrating a data processing system 100 including a memory system 110 in accordance with an embodiment of the present disclosure.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, a game machine, a TV and a projector.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card, and a memory stick. The MMC may include an embedded MMC (eMMC), a reduced size MMC (RS-MMC) and a micro-MMC. The SD card may include a mini-SD card and a micro-SD card.

The memory system 110 may be embodied by various types of storage devices. Non-limiting examples of storage devices included in the memory system 110 include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory. The flash memory may have a 3-dimensional (3D) stack structure.

The memory system 110 may include a memory device 150 and a controller 130. The memory device 150 may store data for the host 120. The controller 130 may control data storage into the memory device 150.

The controller 130 and the memory device 150 may be integrated into a single semiconductor device, which may be included in any of the various types of memory systems described above.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device that retains data stored therein even when power is not supplied. The memory device 150 may store data provided from the host 102 through a write operation. The memory device 150 may provide data stored therein to the host 102 through a read operation. The memory device 150 may include a plurality of memory dies (not shown), each memory die including a plurality of planes (not shown), each plane including a plurality of memory blocks 152 to 156. Each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a Power Management Unit (PMU) 140, a NAND flash controller (NFC) 142 and a memory 144, all operatively coupled, or in communication, via an internal bus.

The host interface 132 may be configured to process a command and data of the host 102, and may communicate with the host 102 according to one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI), and integrated drive electronics (IDE).

The ECC component 138 may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success or fail signal. When the number of error bits is more than a threshold value of correctable error bits, the ECC component 138 may not correct the error bits, and may instead output an error correction fail signal.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited to these error correction techniques. As such, the ECC component 138 may include all circuits, modules, systems or devices for suitable error correction.

The PMU 140 may manage electrical power used and provided in the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 to process data provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130. The memory 144 may store data supporting operations of the memory system 110 and the controller 130. The controller 130 may control the memory device 150 so that read, write, program and erase operations in response to a request from the host 102. The controller 130 may provide data read from the memory device 150 to the host 102, and may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or externally to the controller 130. FIG. 1 illustrated an example of the memory 144 disposed within the controller 130. In another embodiment, the memory 144 may be embodied by an external volatile memory having a memory interface transferring data between the memory 144 and the controller 130.

The processor 134 may control the overall operations of the memory system 110. The processor 134 may use firmware to control the overall operations of the memory system 110. The firmware may be referred to as flash translation layer (FTL).

The processor 134 of the controller 130 may include a management unit (not illustrated) for performing a management operation of bad block(s) of the memory device 150. The management unit may perform a bad block management operation of checking a bad block among the plurality of memory blocks 152 to 156 in the memory device 150. The bad block may be where a program fail occurs during a program operation, due to the characteristics of a NAND flash memory. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

In a memory system in accordance with an embodiment of the present disclosure, the controller 130 may perform a plurality of command operations, corresponding to a plurality of commands received from the host 102, on the memory device 150. For example, the controller 130 may perform a plurality of program operations corresponding to a plurality of write commands, a plurality of read operations corresponding to a plurality of read commands and a plurality of erase operations corresponding to a plurality of erase commands on the memory device 150. In correspondence to performing the command operations, the controller 130 may update metadata, in particular, map data. In particular, in the memory system in accordance with an embodiment of the present disclosure, when the controller 130 performs command operations corresponding to the plurality of commands received from the host 102, on the plurality of memory blocks, characteristic degradations may occur in the memory blocks and, as a result, the operational reliability of the memory device 150 may deteriorate. Thus, the controller 130 performs command operations and a swap operation in the memory blocks of the memory device 150 based on parameters for the memory device 150 in correspondence to the performing of the command operations.

In the memory system in accordance with embodiment of the present disclosure, characteristic degradations may occur in memory blocks as a result of performance of command operations thereon. When command operations are performed for memory blocks in which such characteristic degradations occur, failures may occur in performing the command operations. Therefore, in the memory system the controller 130 checks parameters for the memory blocks, on the command operations performed. In particular, for the erase operations and program operations performed in the plurality of memory blocks, the controller 130 may check erase counts, program counts, program/erase (P/E) cycles or erase/write (E/W) cycles. To reduce or minimize the occurrence of failures in performing command operations due to characteristic degradations in the memory blocks, the controller 130 performs command operations and a swap operation in consideration of parameters. Since detailed description will be made below with reference to FIGS. 5 to 8 for performing of command operations and a swap operation in consideration of parameters for the memory blocks of the memory device 150, further description thereof is omitted here.

A management unit (not shown) for performing bad management for the memory device 150 may be included in, or implemented by, the processor 134 of the controller 130. The management unit checks for a bad block in the plurality of memory blocks 152, 154, 156. The management unit may perform bad block management by identifying or labeling a bad block as bad. In the case where the memory device 150 is a flash memory, for example, a NAND flash memory, a program failure may occur when the controller 130 carries out a program operation with a write data, i.e., data program, due to the characteristic of the NAND flash memory. In that case, the bad block management means that a memory block where the program failure has occurred is determined as a bad, and program-failed data are written, that is, programmed, in a new memory block. Moreover, case where the memory device 150 has a 3-dimensional stack structure as described above, the corresponding memory block is treated as a bad block. It is necessary to reliably perform bad block management because the utilization efficiency of the memory device 150 and the reliability of the memory system 110 may deteriorate abruptly. A memory device in the memory system in accordance with an embodiment of the present disclosure will be described below in detail with reference to FIGS. 2 to 4.

Figure 2:
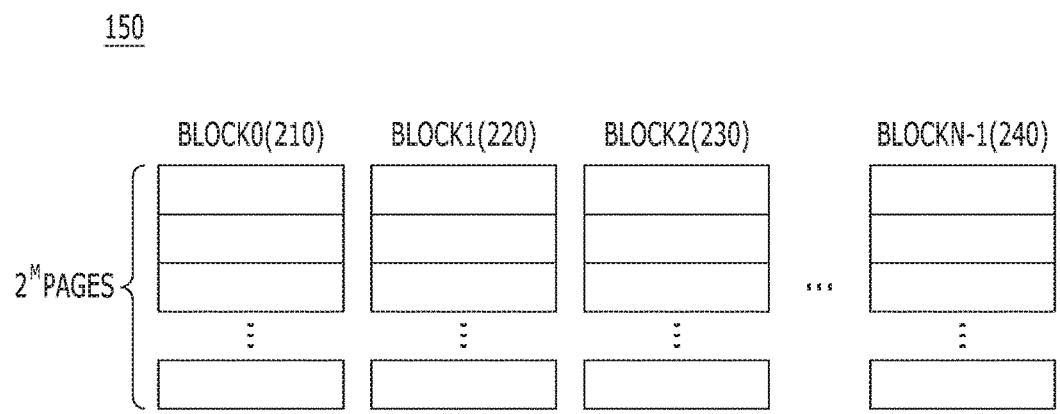
FIG. 2 is a schematic diagram illustrating an exemplary configuration of a memory device employed in the memory system shown in FIG. 1.

FIG. 2 is a schematic diagram illustrating an example of the memory device 150.

Referring to FIG. 2, the memory device 150 may include a plurality of memory blocks, e.g., BLOCK0 (210), BLOCK1 (220), BLOCK2 (230) to BLOCKN−1 (240), and each of these blocks may include a plurality of pages, for example, $2^M$ pages, the number of which may vary according to circuit design. Memory cells included in the respective memory blocks may be one or more of a single level cell (SLC) storing 1-bit data, or a multi-level cell (MLC) storing 2- or more bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
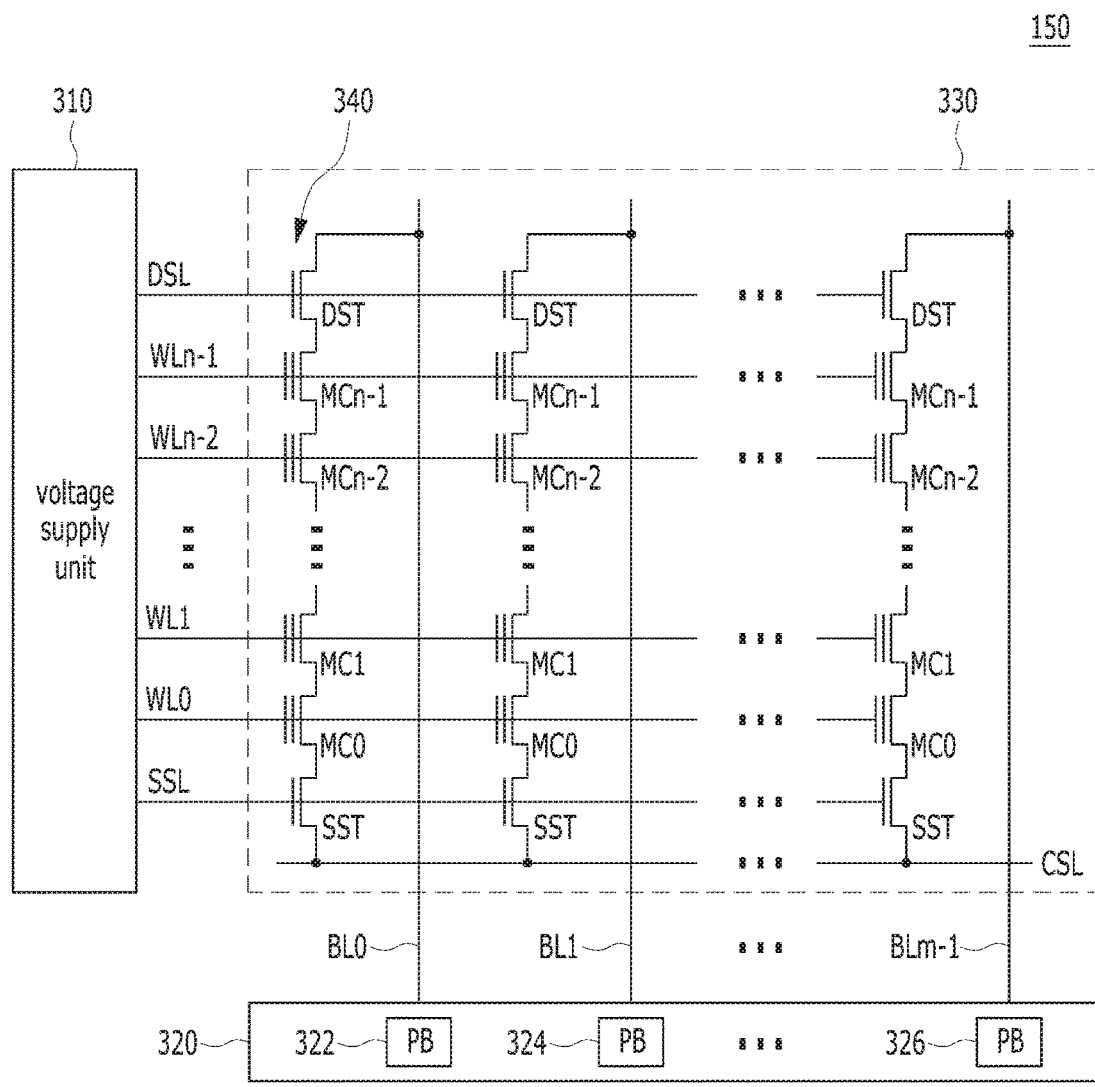
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST, SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the disclosure is not limited in this way. In another embodiment, the memory cells may be a NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated).

Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which Is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and may supply a current or a voltage to bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 4:
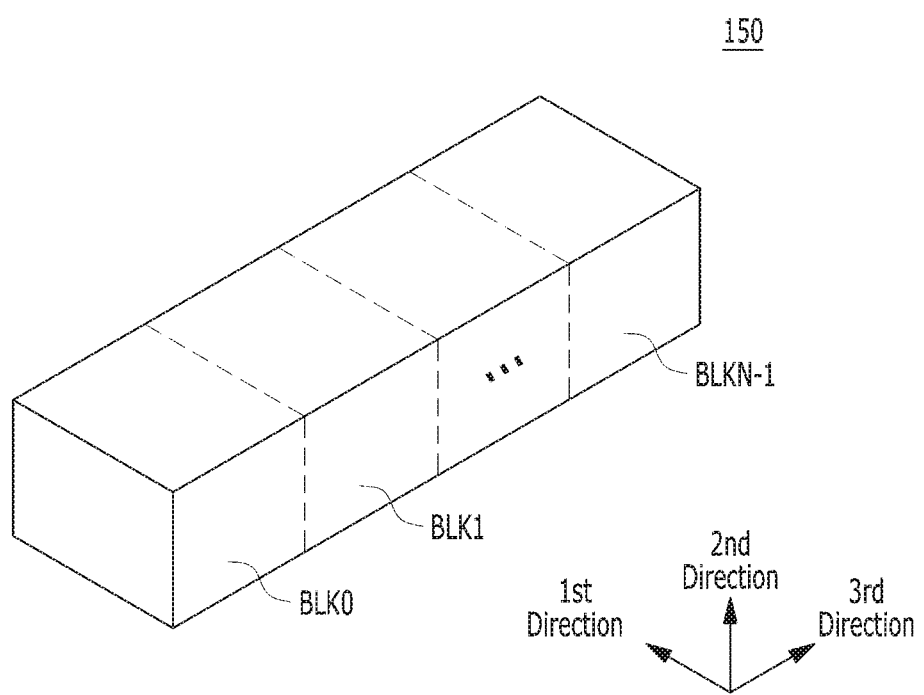
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

A method for performing a garbage collection in a memory system such as that described above will be further described below.

Each of the plurality of memory blocks in a memory device, for example, the memory device 150 shown in FIG. 1, may include a closed block in which a write operation is completed and an open block in which a write operation is being performed. Here, the state in which the write operation is being performed may indicate the process of writing data from the first page to the N-th page of the open block. Here, the N-th page may include the last page of the open block. That is, even if data is written to the last page of the open block, it may still be an open block before performing the closing operation. The closing operation may include generating a physical address to logical address (P2L) map and/or a logical address to physical address (L2P) map for an open block written up to the last page and storing these maps in a memory in a controller, for example, in the memory 144 in the controller 130 shown in FIG. 1. The P2L map may include a mapping information in which physical addresses are set as an index, and the L2P map may include a mapping information in which logical addresses are set as an index. The P2L map and the L2P map may be backed up to the memory device 150 at a set or predetermined time. The P2L map and the L2P map may be selectively loaded into the memory 144 and referred to achieve a specific operation when necessary.

However, before the present invention, a victim block, which is a target block of the garbage collection, was selected from closed blocks. Accordingly, the garbage collection was performed on the selected closed block. More specifically, in this garbage collection, when a specific closed block is selected as a victim block, a P2L map and an L2P map, generated for the specific closed block and stored in the memory device 150, may be loaded into the memory 144. A validity judgment may be performed in which the loaded P2L map and the L2P map are compared with each other, so that a matching page is considered a valid page for storing valid data and a mismatched page is determined as an invalid page for storing invalid data. The valid data stored in the valid page may be copied to a destination block of the garbage collection. The P2L map and the L2P map may be updated based on the copied page(s) in the destination block. Then, an erase operation may be performed on the specific closed block after valid pages are completely moved to the destination block, leaving only invalid pages.

However, in the above case, it may be required that all memory blocks are once closed, that is, P2L maps and L2P maps for all memory blocks are generated, and the P2L maps and the L2P maps are loaded whenever the garbage collection is performed. Therefore, an overload in the operation of the memory system may occur.

In accordance with embodiments of the present disclosure, when a memory block satisfies a specific condition before closing the memory block, a garbage collection may be performed to reduce the number and/or the amount of map generation/update and map loading. A more detailed description will be given with reference to FIGS. 5 to 8.

Figure 5:
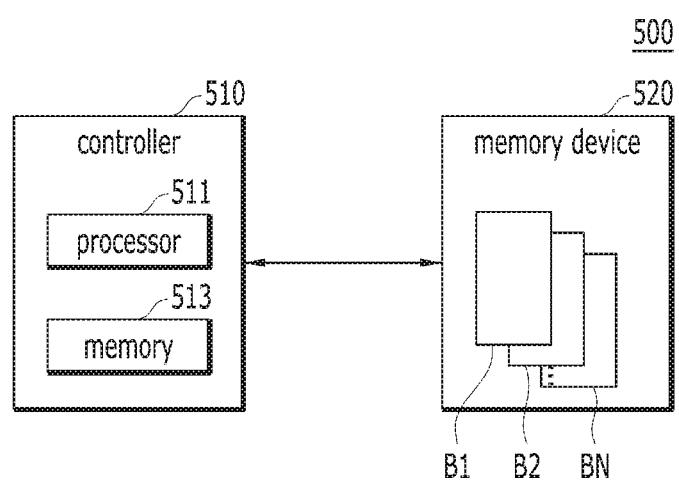
FIG. 5 is a diagram illustrating a memory system in accordance with another embodiment of the present disclosure.
Figure 6:
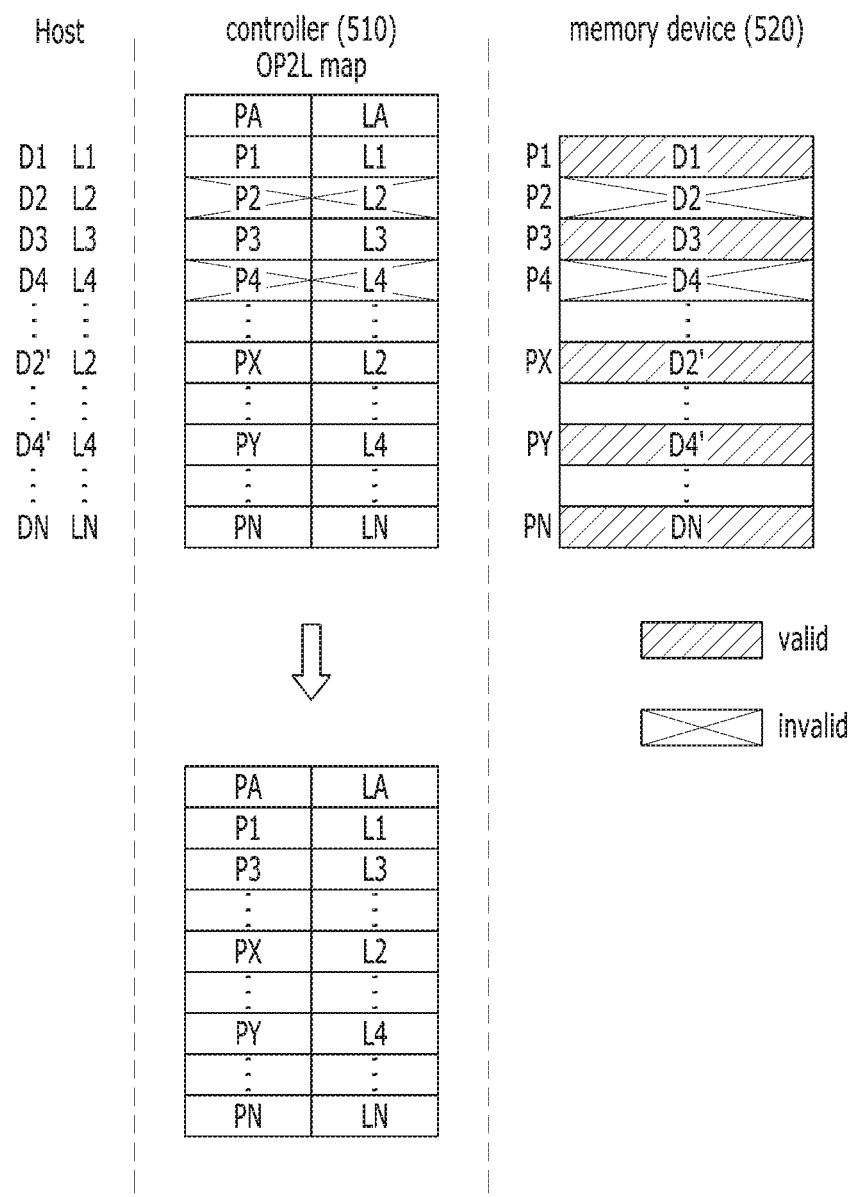
FIG. 6 is a diagram illustrating an exemplary process of writing data to an open block in the memory system of FIG. 5 and a map generated by the process.
Figure 7:
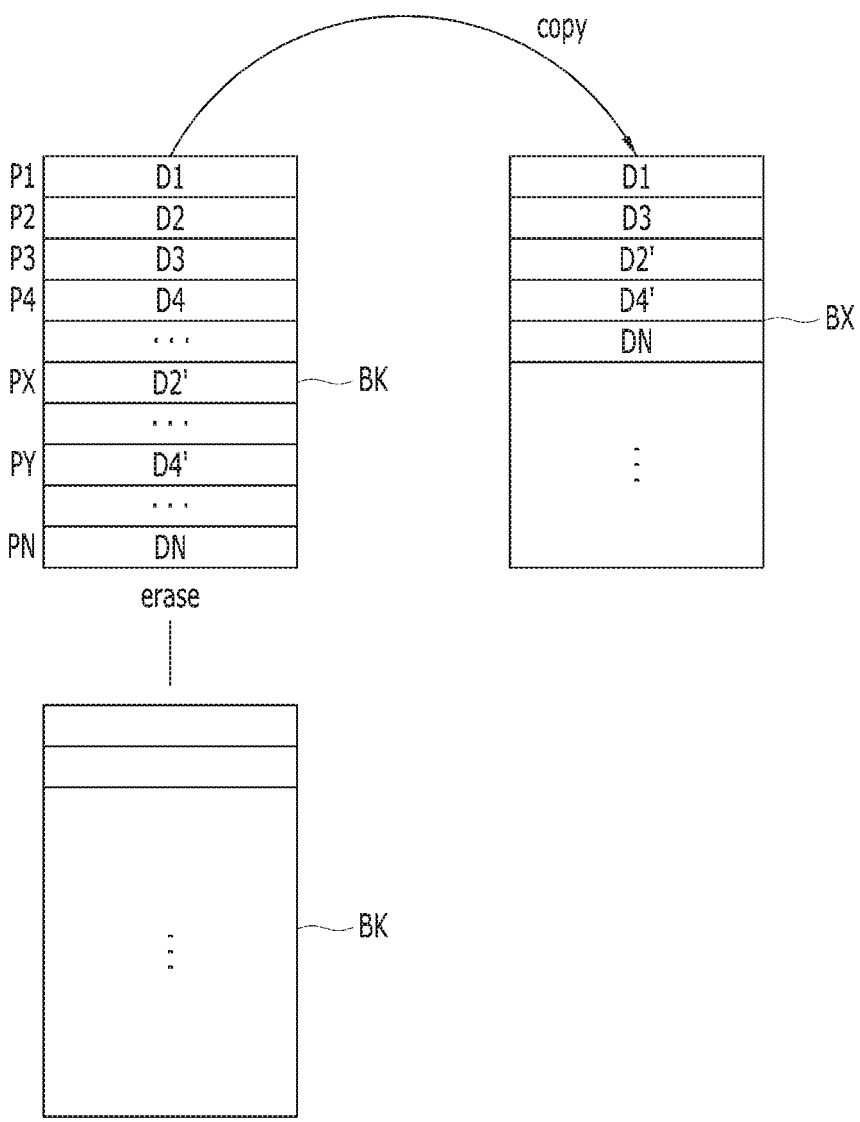
FIG. 7 is a diagram illustrating an exemplary method of performing a garbage collection in the memory system of FIG. 5.

FIG. 5 is a diagram illustrating a memory system in accordance with another embodiment of the present disclosure, FIG. 6 is a diagram illustrating a process of writing data to an open block in the memory system of FIG. 5 and a map generated by the process, and FIG. 7 is a diagram Illustrating a method of performing a garbage collection in the memory system of FIG. 5.

First, referring to FIG. 5, a memory system 500 according to an embodiment may include a memory device 520 in which data is stored and a controller 510 which controls operations of the memory device 520 in response to commands received from a host (not shown).

The memory device 520 of this embodiment may be the same as or similar to the memory device 150 of FIG. 1. In other words, the memory device 520 may perform functions that are the same as or similar to functions of the memory device 150 of FIG. 1. In addition, the memory device 520 may include some or all of the components of the memory device 150 of FIG. 1. The memory device 520 may further include other components not shown in FIG. 1. The memory device 520 may be a non-volatile memory.

The memory device 520 of the present embodiment may include a plurality of memory blocks B1, B2, . . . , BN, each of which may include a plurality of pages. Further, the memory blocks B1, B2, . . . , BN may include a closed block in which a write operation is completed and an open block in which a write operation is being performed.

The controller 510 of this embodiment may be the same as or similar to the controller 130 of FIG. 1. In other words, the controller 510 may perform functions that are the same as or similar to functions of the controller 130 of FIG. 1. In addition, the controller 510 may include some or all of the components of the controller 130 of FIG. 1. The controller 510 may further include other components not shown in FIG. 1.

In this embodiment, the controller 510 may include a processor 511 for controlling various operations of the memory system 500 and a memory 513 functioning as an operation memory, a buffer memory and/or a cache memory and in communication with the processor 511. The processor 511 may perform functions that are the same as or similar to functions of the processor 134 of FIG. 1, and the memory 513 may perform functions same as or similar to functions of the memory 144 of FIG. 1. The memory 513 may be a volatile memory.

In particular, when the processor 511 stores data in the memory device 520 in response to a write request from the host, the processor 511 may generate a mapping information by associating a logical address LA included in the write request with a physical address PA of the memory device 520. The processor 511 may store the mapping information in the memory 513. More specifically, the processor 511 may sequentially store input data from the first page to the last page of a specific memory block among the plurality of memory blocks B1, B2, . . . , BN of the memory device 520. The specific memory block may correspond to an open block because data is being written. In this embodiment, it is shown that plural data are sequentially stored from the first page to the last page, but in other embodiments plural data may be stored in a different order or way. As an example, data may be randomly stored in an empty page of an open block. In addition, the processor 511 may generate mapping information while storing data in the open block, wherein the generated mapping information may be a P2L map for the open block. The P2L map for the open block may be referred to as an OP2L map. This OP2L map may be different from the P2L map and the L2P map generated for a closed block described above. The OP2L map for the open block may include or reflect the latest information, which may be continuously or regularly updated until an attribute of the open block is changed (i.e., a new data is written in an empty page of the open block). FIG. 6 illustrates an example, which is described below.

Referring to FIG. 6, data and a logical address corresponding to this data, in addition to the write request of the host, may be input to the controller 510. In FIG. 6, data sequentially input is represented by D1, D2, D3, D4, . . . , DN, and logical addresses corresponding to these data, respectively, are represented by L1, L2, L3, L4, . . . , LN. Here, new data with a new or unused logical address may be input, or updated data with the same logical address associated with the previously input data may be input. As an example, the write request of data D2' in which the data D2 is updated may be input together with the logical address L2. The write request of data D4' in which the data D4 is updated may be input together with the logical address L4. When the updated data D2' and D4' are input, the previous data D2 and D4 may be invalid data.

The processor 511 of the controller 510 may store the data D1, D2, D3, D4, . . . , DN to corresponding pages P1, P2, P3, P4, . . . , PN of a specific block BK of the memory device 520, where K is a natural number equal to or greater than 1 and equal to or less than N. The processor 511 may generate a mapping information by associating the physical address including the page information with the logical address. The processor 511 may store the mapping information in the memory 513 of the controller 510. Since the data is being written in the specific block BK, the specific block BK may be referred to as an open block BK. Also, the mapping information generated may be an OP2L map for the open block BK. The OP2L map may be a mapping information in which the physical address is set as an index. The OP2L map may be generated and/or updated whenever the data is stored in the open block BK. For example, when the write request including the logical address L1 and the data D1 is input from the host, the processor 511 may store the data D1 in the page P1 of the open block BK. The processor 511 may generate the OP2L map including a list in which the logical address L1 is associated with the physical address P1. Then, when the write request including the logical address L2 and the data D2 is input from the host, the processor 511 may store the data D2 in the page P2 of the open block BK. The processor 511 may update the OP2L map to add a list in which the logical address L2 is associated with the physical address P2. In a similar manner, the data D3 may be stored in the page P3, and a list in which the logical address L3 corresponds to the physical address P3 may be added to the OP2L map. Also, in a similar manner, the data D4 may be stored in the page P4, and a list in which the logical address L4 corresponds to the physical address P4 may be added to the OP2L map.

In the above process, if the logical address that is the same as the logical address previously input from the host, for example, the logical address L2 is input together with the data D2', the previous data D2 may be replaced with D2'. However, since the data cannot be overwritten on the page where the data is already stored, the processor 511 may store the data D2' in the empty page PX of the open block BK and update the OP2L map to add an entry to indicate that the logical address L2 is associated with the physical address PX. The previous entry including the logical address L2 and the corresponding physical address P2, in the OP2L map, may be deleted. In a similar manner, when the logical address L4 is input together with the data D4', the processor 511 may store the data D4' in the empty page PY of the open block BK, add an entry indicating that the logical address L4 corresponds to the physical address PY, and update the OP2L map so that the previous entry including the logical address L4 and the corresponding physical address P4 is deleted. In this manner, if data is written to the last page PN of the open block BK, the OP2L map may include the list of multiple entries as shown below the arrow in FIG. 6. That is, the OP2L map may include the physical addresses indicating only valid pages while not including information on invalid pages. As a result, the OP2L map may represent the latest address information of the data written in the open block BK.

In this embodiment, a garbage collection may be performed using the above OP2L map. Such operation is described below in more detail.

Referring again to FIG. 5, it has already been described that the processor 511 generates the OP2L map and stores the OP2L map in the memory 513 while storing the data in the open block BK of the memory device 520. Furthermore, the processor 511 may manage information on a valid page count VPC as needed while generating/updating the OP2L map. When the OP2L map contains only the address(es) of the valid page(s), the processor 511 may store the number of the physical addresses in the OP2L map and/or the number of entries or items in which the logical addresses correspond to the physical addresses as a valid page count information in the memory 513 whenever the OPL2 map is generated/updated.

Furthermore, when the processor 511 determines that data is stored up to the last page PN of the open block BK, that is, that data is stored in all the pages of the open block BK and no empty page exists, the processor 511 may determine whether the number of the valid pages of the open block BK is equal to or less than a threshold value, which may be predetermined, before closing the open block BK. The processor 511 may confirm the number of the valid pages of the open block BK by checking the valid page count information of the open block BK stored in the memory 513, checking the number of the physical addresses in the OP2L map, and/or the number of the lists in which the logical addresses correspond to the physical addresses. Then, the processor 511 may compare the number of the valid pages of the open block BK with the threshold value. Here, the threshold value may be variously adjusted in consideration of the performance of the memory system 500. For example, the threshold value may be determined in consideration of throughput of the garbage collection, write latency, and the like.

As a result of the above determination, when the number of the valid pages of the open block BK is equal to or less than the threshold value, garbage collection may be performed immediately on the open block BK without closing the open block BK. When the number of the valid pages of the open block BK is already too low, the probability of becoming a target of the garbage collection may be very high. Therefore, it may be unnecessary and Inefficient to perform the closing process for this open block BK having much invalid data. For example, in the closing process a process of generating an L2P map and a PL2 map and backing them up to the memory device 520 is performed. Further, the processor 511 may load the maps and judge their validity when the open block BK becomes a target of the garbage collection. Therefore, in this embodiment, the number of the valid pages may be checked every time the open block BK is closed, that is, every time the last page of the open block BK is written so that the garbage collection may be performed if necessary.

Here, the garbage collection may be performed using the OP2L map. It has been described above that the OP2L map includes only the physical address(es) of the valid page(s). Accordingly, the processor 511 may copy the data of the page(s) corresponding to the physical address(es) in the OP2L map, among all the pages of the open block BK, into the destination block of the garbage collection. The processor 511 may perform an erase operation on the open block BK in which only invalid page(s) remain(s) to generate a free block including only the empty page. FIG. 7 illustrates an example, which is described below.

Referring to FIG. 7, in the open block BK having a number of the valid pages less than or equal to the threshold value, the processor 511 may copy the valid data D1, D3, D2', D4', . . . , DN stored in the valid pages into the pages of the new block BX of the memory device 520.

As a result, only invalid pages may remain in the open block BK. The processor 511 then deletes all the data of the open block BK by performing an erase operation on the open block BK to change the open block BK to a free block.

Referring again to FIG. 5, if the number of valid pages of the open block BK is greater than the threshold value as a result of the determination, the open block BK may be closed. That is, the L2P map and the P2L map on the open block BK may be generated. The L2P map and the P2L map may be generated using the OP2L map and temporarily stored in the memory 513, and then, backed up to the memory device 520. Thus, the open block BK may be converted into a closed block. Subsequent operations may be the same or substantially the same as corresponding operations in previously described embodiments. For example, if the closed block is selected as a victim block according to a condition, which may be predetermined, the garbage collection may be performed in such a manner that the P2L map and the L2P map stored in the memory device 520 is loaded into the memory 513, the validity of the loaded P2L map and the L2P map is determined by comparing the maps with each other, the valid data stored in the valid page is copied to the destination block of the garbage collection, the erase operation is performed on the specific closed block including only the invalid page, and the P2L map and the L2P map are updated based on the valid page of the destination block.

According to embodiments of the memory system and its operation methods described above, the garbage collection may be performed in advance for the open block BK, which is highly likely to require such operation, by adding a simple and effective operation for confirming the number of the valid pages for each closing time of the open block BK. Thus, it may be possible to reduce the number and/or amount of map generation/update and map loading. As a result, the operation performance of the memory system may be improved FIG. 8 is a flowchart illustrating a method of operating a memory system according to another embodiment of the present disclosure.

Figure 8:
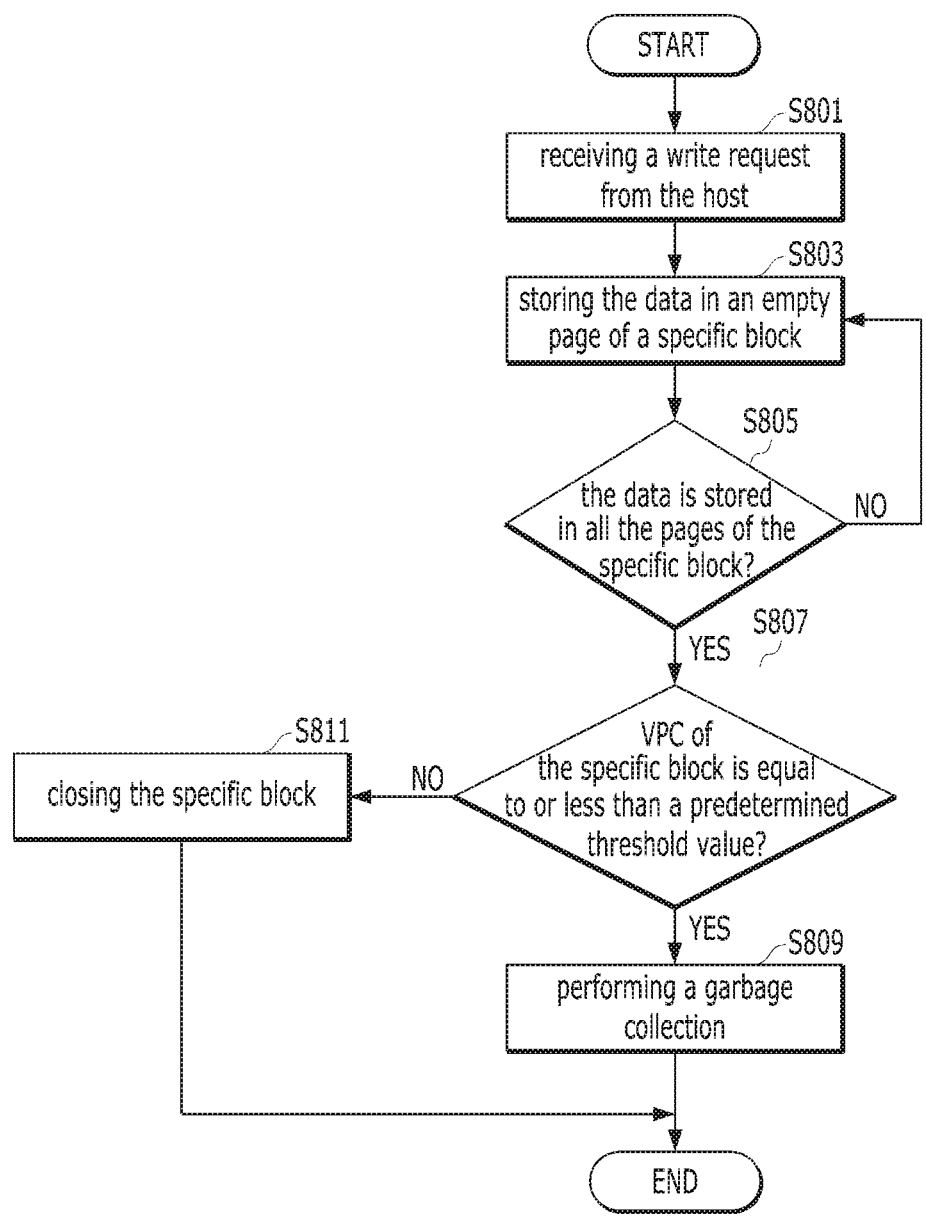
FIG. 8 is a flowchart illustrating a method of operating a memory system according to another embodiment of the present disclosure.

Referring to FIG. 8, the processor 511 of the controller 510 may receive a write request of data from the host (S801). The write request may include data and its corresponding logical address.

The processor 511 may store the data in an empty page of the specific block BK of the memory device 520 in response to the host's write request (S803). The storage of the data may be sequentially performed from the first page to the last page, but the embodiment is not limited thereto. This specific block BK may also be referred to as an open block. Furthermore, in this step S803, the processor 511 may generate the mapping information by matching the physical address corresponding to the page in which the data is written with the logical address included in the write request. The mapping information may include an OP2L map of the specific block BK. Furthermore, information on the number of the valid pages of the specific block BK may be generated and managed.

Then, the processor 511 may determine whether the data is stored in all the pages of the specific block BK (S805). If the data is stored sequentially from the first page to the last page, the processor 511 may check whether the data is stored in the last page.

As a result of the determination in the step S805, if there is an empty page in the specific block BK, the processor 511 may return to the step S803 to store the continuously input data in the empty page.

On the other hand, as a result of the determination in the step S805, if the data is stored in all the pages of the specific block BK, the processor 511 may determine whether the number of the valid pages VPC of the specific block BK is equal to or less than a threshold value before closing the specific block BK (S807). The threshold value may be predetermined. The processor 511 may obtain the number of the valid pages of the specific block BK by checking the valid page count information stored in the memory 513 or by counting the number of lists in the OP2L map stored in the memory 513.

As a result of the determination in the step S807, if the number of the valid pages VPC of the specific block BK Is equal to or less than the threshold value, the garbage collection may be performed immediately on the specific block BK (S809). The garbage collection may be performed using the OP2L map. That is, the page of the specific block BK corresponding to the physical address present in the OP2L map may be copied to a new memory block, and then, the specific block BK may be erased.

On the other hand, as a result of the determination in the step S807, if the number of the valid pages VPC of the specific block BK is greater than the threshold value, the specific block BK may be closed (S811). The closed specific block may be subjected to the garbage collection later according to a condition, which may be predetermined. However, the garbage collection performed at this time may be performed using the L2P map and the P2L map of the closed specific block, so it may be different from the garbage collection performed in the step S809, that is, the garbage collection performed using the OP2L map of the specific block BK which is in the open state.

Detailed description will be made, with reference to FIGS. 9 to 17, for a data processing system and electronic appliances to which the memory system 110 including the memory device 150 and the controller 130 described above, in accordance with embodiments of the present disclosure, may be applied.

FIGS. 9 to 17 are diagrams schematically illustrating exemplary applications of the data processing system of FIG. 1.

Figure 9:
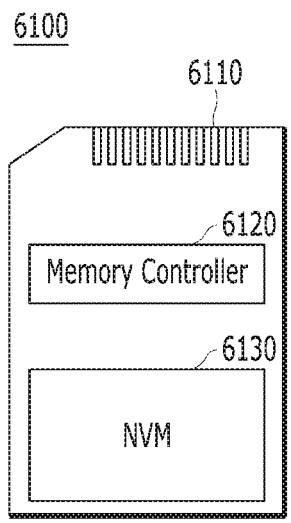
FIGS. 9 to 17 are diagrams schematically illustrating exemplary applications of the data processing system shown in FIG. 1 in accordance with various embodiments of the present disclosure.

FIG. 9 is a diagram schematically illustrating another example of the data processing system including the memory system in accordance with an embodiment. FIG. 9 schematically illustrates a memory card system to which the memory system is applied.

Referring to FIG. 9, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. For example, the memory controller 6120 may be configured to control read, write, erase and background operations of the memory device 6130. The memory controller 6120 may be configured to provide an interface between the memory device 6130 and a host, and use firmware for controlling the memory device 6130. That is, the memory controller 6120 may correspond to the controller 130 of the memory system 110 described with reference to FIGS. 1 to 8, and the memory device 6130 may correspond to the memory device 150 of the memory system 110 described with reference to FIGS. 1 to 8.

Thus, the memory controller 6120 may include a RAM, a processor, a host interface, a memory interface and an error correction component. The memory controller 130 may further include the elements shown in FIGS. 1 to 8.

The memory controller 6120 may communicate with an external device, for example, the host 102 of FIG. 1 through the connector 6110. For example, as described with reference to FIG. 1, the memory controller 6120 may be configured to communicate with an external device according to one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI, and Bluetooth. Thus, the memory system and the data processing system may be applied to wired/wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM), and a spin torque transfer magnetic RAM (STT-RAM). The memory device 6130 may include a plurality of dies as in the memory device 150 of FIGS. 1 to 8.

The memory controller 6120 and the memory device 6130 may be integrated into a single semiconductor device. For example, the memory controller 6120 and the memory device 6130 may be so integrated to form a solid state driver (SSD). Alternatively, the memory controller 6120 and the memory device 6130 may be so integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC), and a universal flash storage (UFS).

Figure 10:
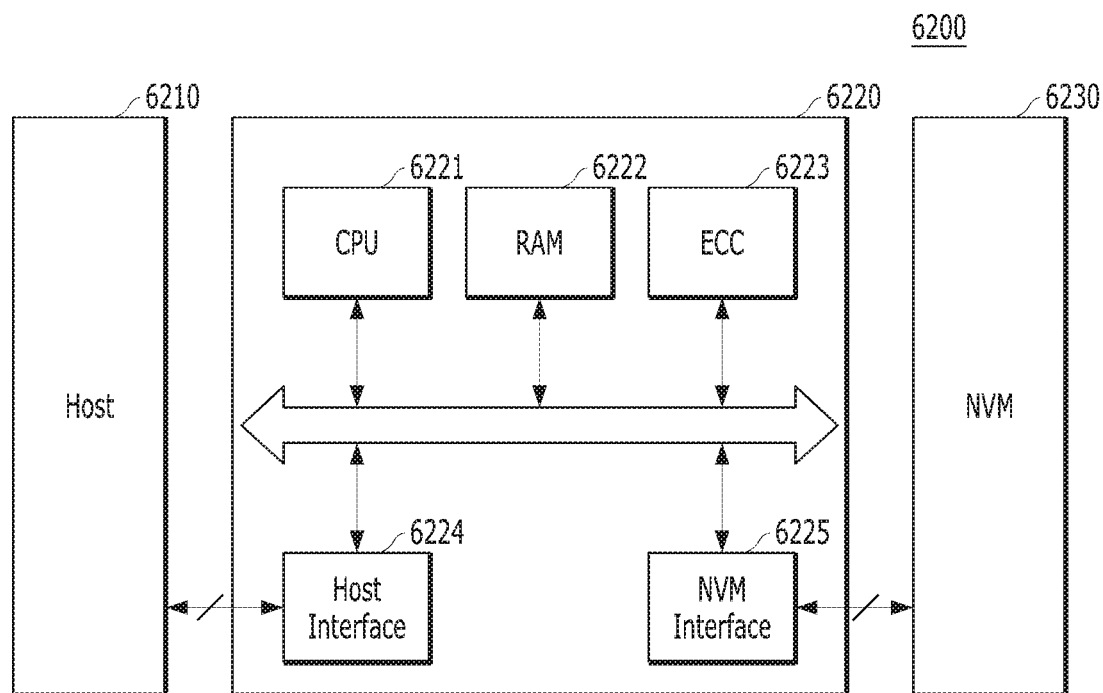

FIG. 10 is a diagram schematically illustrating another example of the data processing system including the memory system in accordance with an embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 to 8, and the memory controller 6220 may correspond to the controller 130 in the memory system 110 illustrated in FIGS. 1 to 8.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with an embodiment may be applied to wired/wireless electronic devices, particularly a mobile electronic device.

Figure 11:
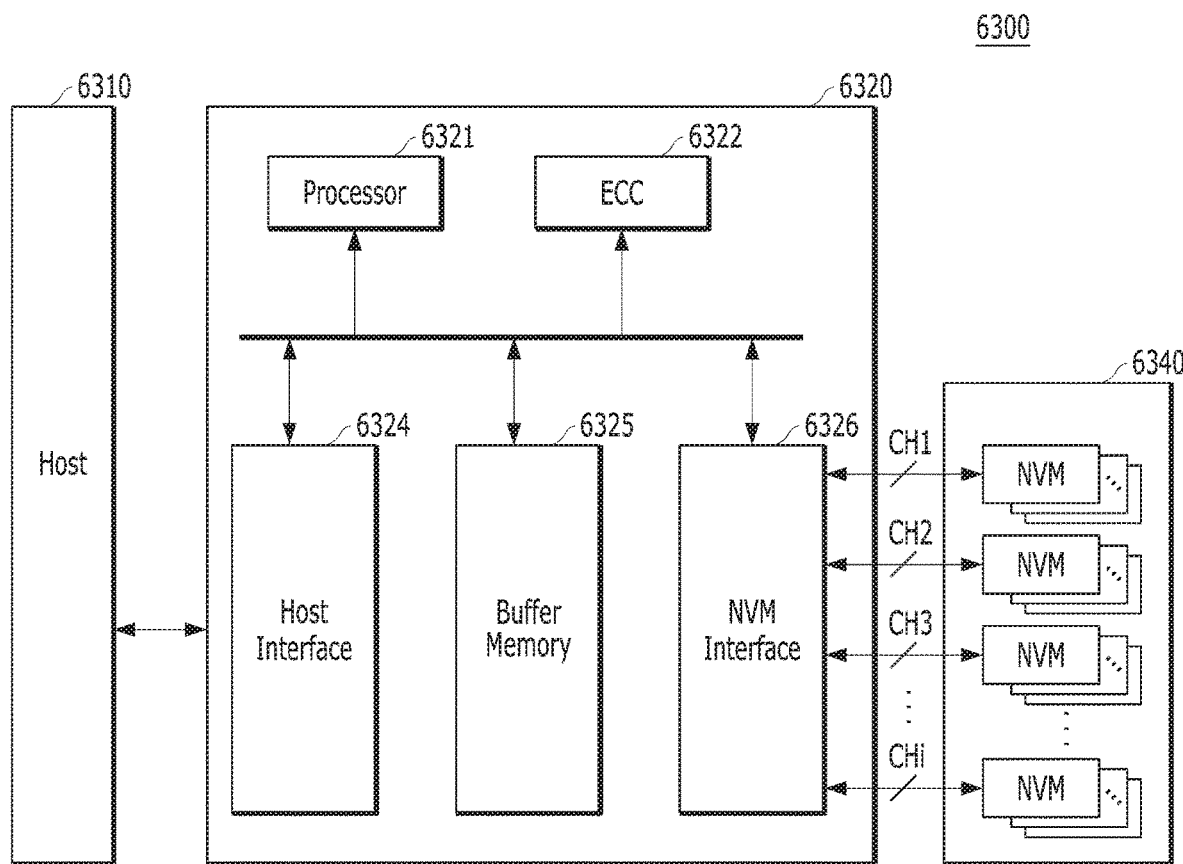

FIG. 11 is a diagram schematically illustrating another example of the data processing system including the memory system in accordance with an embodiment. FIG. 11 schematically illustrates an SSD to which the memory system is applied.

Referring to FIG. 11, the SSD 6300 may include a controller 6320 and a memory device 6340 including a plurality of nonvolatile memories. The controller 6320 may correspond to the controller 130 in the memory system 110 of FIGS. 1 to 8, and the memory device 6340 may correspond to the memory device 150 in the memory system of FIGS. 1 to 8.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. FIG. 10 illustrates that the buffer memory 6325 is disposed in the controller 6320. However, the buffer memory 6325 may be external to the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation, and may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 to 8 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 12:
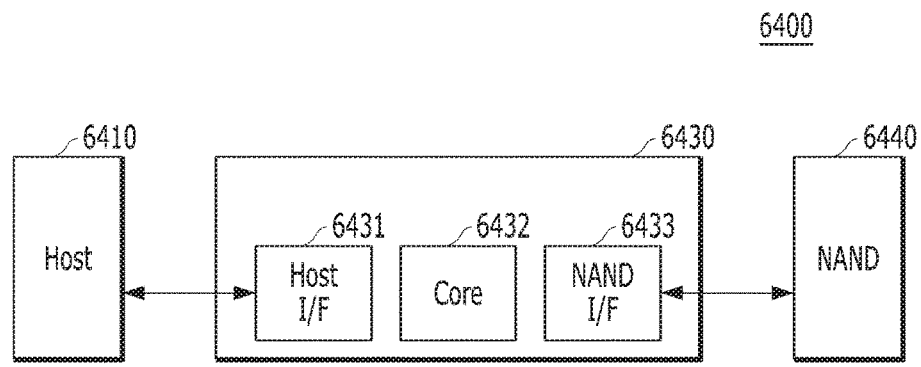

FIG. 12 is a diagram schematically illustrating another example of the data processing system including the memory system in accordance with an embodiment. FIG. 12 schematically illustrates an embedded Multi-Media Card (eMMC) to which the memory system is applied.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 to 8, and the memory device 6440 may correspond to the memory device 150 in the memory system 110 of FIGS. 1 to 8.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC Interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with embodiments. FIGS. 13 to 16 schematically illustrate UFS (Universal Flash Storage) systems to which the memory system are applied.

Referring to FIGS. 13 to 16, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 to 8. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 10 to 12, and the UFS cards 6530, 6630, 6730, 6830 may be embodied in the form of the memory card system 6100 described with reference to FIG. 9.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 13:
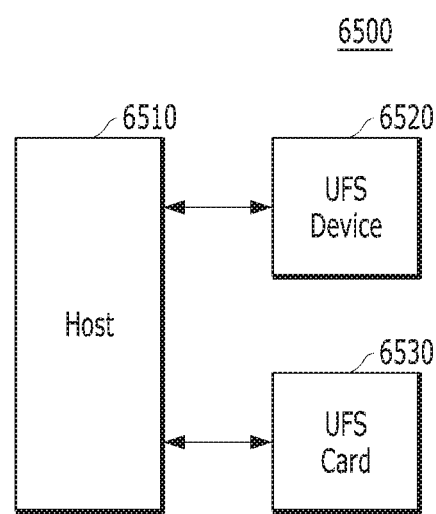

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the present embodiment, the configuration in which one UFS device 6520 and one UFS card 6530 are connected to the host 6510 is illustrated. However, in another embodiment, a plurality of UFS devices and UFS cards may be connected in parallel or in the form of a star to the host 6410. The star form is an arrangement where a single centralized component is coupled to plural devices for parallel processing. A plurality of UFS cards may be connected in parallel or in the form of a star to the UFS device 6520 or connected in series or in the form of a chain to the UFS device 6520.

Figure 14:
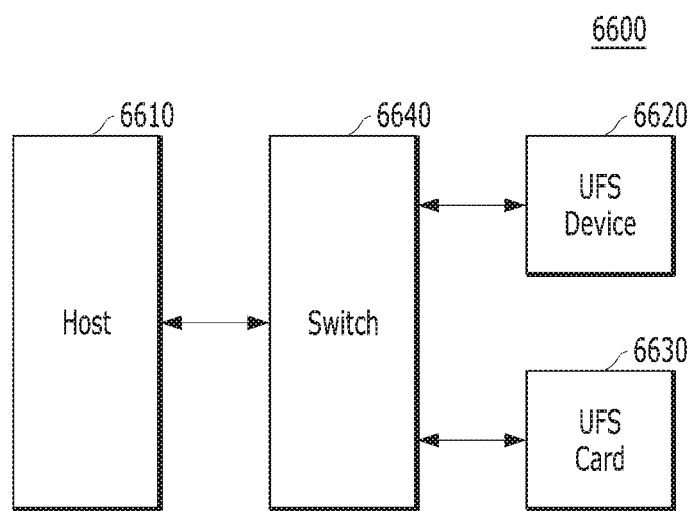

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 is illustrated. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 15:
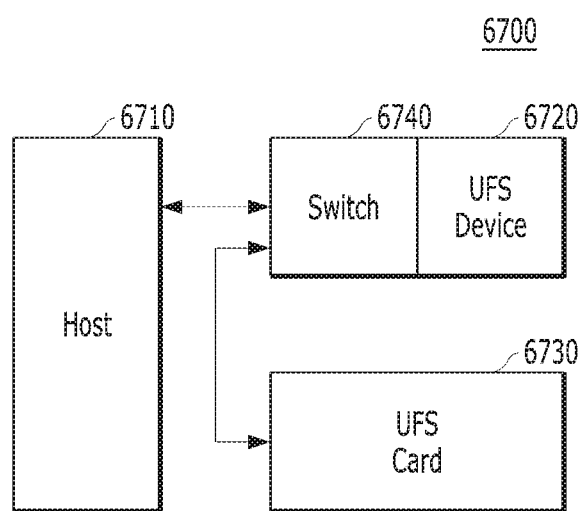

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 is illustrated. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
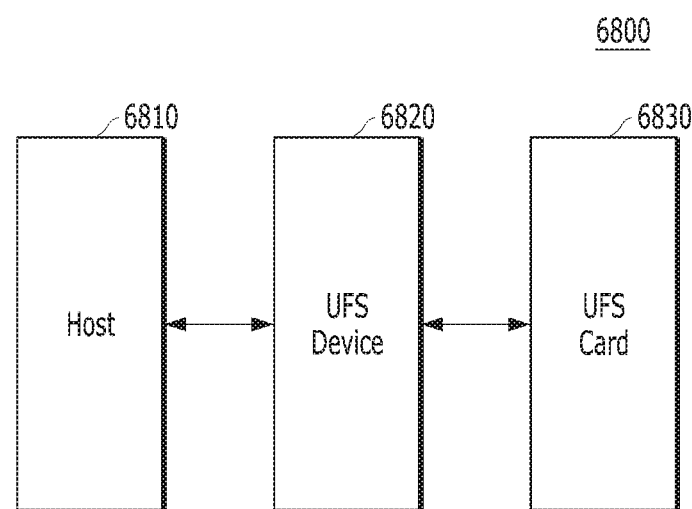

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 is illustrated. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
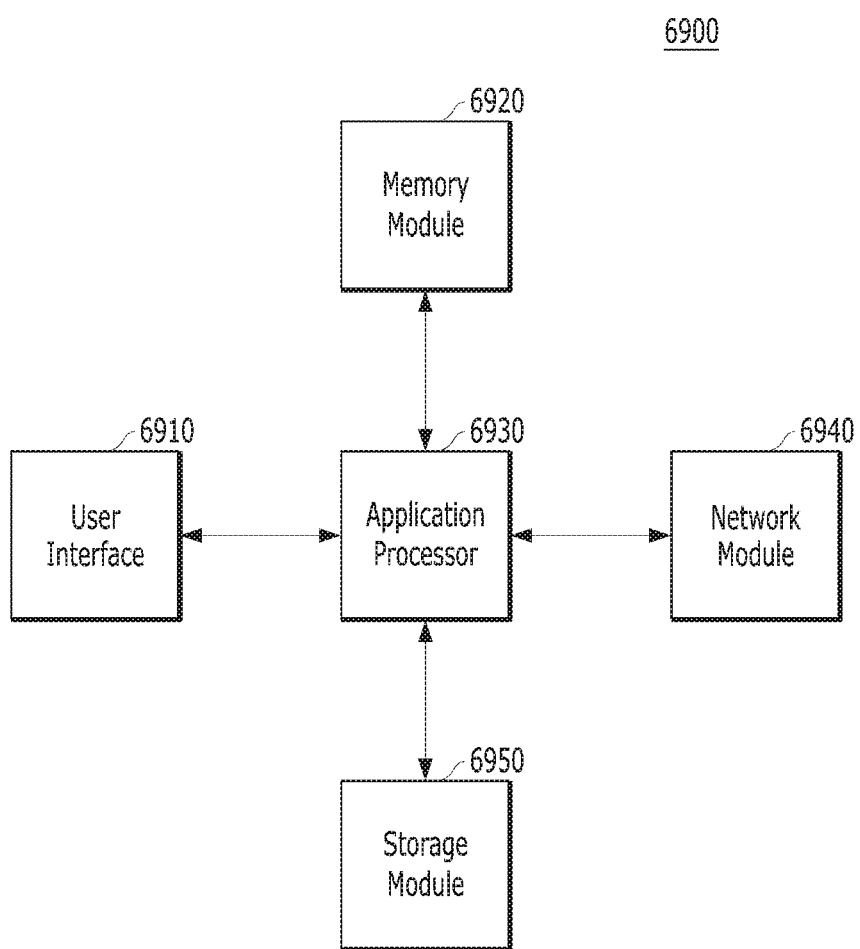

FIG. 17 is a diagram schematically illustrating another example of the data processing system including the memory system in accordance with an embodiment. FIG. 17 is a diagram schematically illustrating a user system to which the memory system is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present disclosure, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIGS. 1 to 8. Furthermore, the storage module 6950 may be embodied as an SSD, an eMMC and an UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 to 8 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. Further, the user interface 6910 may support a function of receiving data from the touch panel.

The memory system and the operating method thereof according to embodiments may reduce or minimize complexity and performance deterioration of the memory system and enhance or maximize use efficiency of a memory device, thereby quickly and stably process data with respect to the memory device.

Although various embodiments have been described and illustrated, it will be apparent to those skilled in the art that various changes and modifications may be made without departing from the spirit and scope of the disclosure as defined in the following claims.

What is claimed is:

1. A controller, comprising:
    a processor; and
    a memory,
    wherein, when data is stored in all pages of an open block of a memory device, the processor determines a number of valid pages in the open block and performs a garbage collection on the open block before closing the open block when the number of valid pages is determined to be less than or equal to a threshold value, and performs closing the open block and generating a physical address to logical address (P2L) map and a logical address to physical address (L2P) map for the closed block when the number of the valid pages is determined to exceed the threshold value, wherein the number ranges from zero to a number of total pages in the open block, and the P2L map and the L2P map are not generated for the open block on which the garbage collection is performed.

2. The controller according to claim 1, wherein the processor generates mapping information on the open block and stores the mapping information in the memory while storing data in the open block.

3. The controller according to claim 2, wherein the mapping information includes a physical address to logical address (P2L) map in which a logical address corresponding to the data is mapped to a physical address.

4. The controller according to claim 2, wherein the mapping information includes a physical address corresponding to the valid pages and does not include a physical address corresponding to one or more invalid pages.

5. The controller according to claim 2, wherein the processor performs the garbage collection using the mapping information.

6. The controller according to claim 2, wherein the processor stores information on the number of the valid pages of the open block in the memory while generating the mapping information.

7. A method for operating a controller, comprising:
    storing data in an open block of a memory device in response to a data write request from a host;
    determining a number of valid pages in the open block when data is stored in all pages of the open block, wherein the number ranges from zero to a number of total pages in the open block; and
    performing a garbage collection on the open block before closing the open block when the number of valid pages is determined to be less than or equal to a threshold value, and performing closing the open block and generating a physical address to logical address (P2L) map and a logical address to physical address (L2P) map for the closed block when the number of the valid pages is determined to exceed the threshold value, where the P2L map and the L2P map are not generated for the open block on which the garbage collection is performed.

8. The method according to claim 7, wherein the storing of the data in the open block includes generating mapping information on the open block and storing the mapping information in a memory.

9. The method according to claim 8, wherein the mapping information includes a physical address to logical address (P2L) map in which a logical address corresponding to the data is mapped to a physical address.

10. The method according to claim 8, wherein the mapping information includes a physical address corresponding to the valid pages and does not include a physical address corresponding to one or more invalid pages.

11. The method according to claim 8, wherein the performing of the garbage collection uses the mapping information.

12. The method according to claim 8, wherein the generating of the mapping information further includes storing information on the number of valid pages of the open block in the memory.

13. A memory system, comprising:
    a memory device for storing data; and
    a controller for controlling the memory device,
    wherein, when data is stored in all pages of an open block of the memory device, the controller determines a number valid pages in the open block and performs a garbage collection on the open block before closing the open block when it is determined that the number of the valid pages is less than or equal to a threshold value, and performs closing the open block and generating a physical address to logical address (P2L) map and a logical address to physical address (L2P) map for the closed block when the number of the valid pages is determined to exceed the threshold value, wherein the number ranges from zero to a number of total pages in the open block, and the P2L map and the L2P map are not generated for the open block on which the garbage collection is performed.

14. The memory system according to claim 13, wherein the controller generates mapping information on the open block and manages the mapping information while storing data in the open block.

15. The memory system according to claim 14, wherein the mapping information includes a physical address corresponding to the valid pages while not including a physical address corresponding to one or more invalid pages.

16. The memory system according to claim 14, wherein the controller performs the garbage collection using the mapping information.

17. A memory system, comprising:
a memory device including a plurality of blocks, each for storing data, wherein each block is closed after a last page of that block is programmed with a data; and
a controller configured to control operations carried out in the memory device,
wherein, before a select block, of the plurality of blocks, is closed, the controller determines whether to perform a garbage collection on the select block based on a condition pertaining to a number of valid pages in the select block, and
wherein the controller performs the garbage collection on the select block when the condition is met, and
wherein the controller performs closing the open block and generating a physical address to logical address (P2L) map and a logical address to physical address (L2P) map for the closed block when the condition is not met, and the P2L map and the L2P map are not generated for the selected block on which the garbage collection is performed.

* * * * *